US007355967B2

(12) United States Patent
Tazawa et al.

(10) Patent No.: US 7,355,967 B2
(45) Date of Patent: Apr. 8, 2008

(54) TRANSMISSION DEVICE

(75) Inventors: Hideaki Tazawa, Kawasaki (JP);
Hideaki Mochizuki, Kawasaki (JP);
Hiroshi Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 867 days.

(21) Appl. No.: 10/090,939

(22) Filed: Mar. 5, 2002

(65) Prior Publication Data
US 2003/0048747 A1 Mar. 13, 2003

(30) Foreign Application Priority Data
Sep. 10, 2001 (JP) ............................. 2001-273190

(51) Int. Cl.
*H04L 12/26* (2006.01)
(52) U.S. Cl. ...................................... 370/225
(58) Field of Classification Search ................ 370/223, 370/395.1, 474, 352, 241; 709/238, 227, 709/247
See application file for complete search history.

(56) References Cited

U.S. PATENT DOCUMENTS

| 5,406,401 A | | 4/1995 | Kremer | |
|---|---|---|---|---|
| 5,621,728 A | * | 4/1997 | Lightfoot et al. | 370/397 |
| 5,740,075 A | * | 4/1998 | Bigham et al. | 709/229 |
| 6,343,322 B2 | * | 1/2002 | Nagami et al. | 709/227 |
| 6,434,169 B1 | * | 8/2002 | Verreault | 370/522 |
| 6,600,735 B1 | * | 7/2003 | Iwama et al. | 370/352 |
| 6,611,872 B1 | * | 8/2003 | McCanne | 709/238 |
| 6,721,269 B2 | * | 4/2004 | Cao et al. | 370/227 |
| 6,772,219 B1 | * | 8/2004 | Shobatake | 709/238 |
| 6,934,248 B1 | * | 8/2005 | DeBoer et al. | 370/217 |
| 6,950,409 B1 | * | 9/2005 | Kettinger | 370/258 |
| 2002/0181485 A1 | * | 12/2002 | Cao et al. | 370/419 |
| 2003/0235187 A1 | * | 12/2003 | Iwama et al. | 370/352 |
| 2004/0223451 A1 | * | 11/2004 | Homma et al. | 370/228 |

FOREIGN PATENT DOCUMENTS

| JP | 5-316133 | 11/1993 |
|---|---|---|
| JP | 6-205028 | 7/1994 |
| JP | 09093278 | 4/1997 |
| JP | 10-13426 | 1/1998 |

OTHER PUBLICATIONS

Japanese Office Action issued on May 9, 2006, with translation.

* cited by examiner

*Primary Examiner*—Chi Pham
*Assistant Examiner*—Anh-Vu Ly
(74) *Attorney, Agent, or Firm*—Katten Muchin Rosenman LLP

(57) ABSTRACT

There is disclosed a transmission device performing NUT setting and its establishment efficiently and precisely. A setting information relay unit relays setting information that places a specific channel out of a channel used for restoration. A channel establishment unit determines, by referring to the setting information, whether a channel of interest should be placed out of a channel for restoration and establish the channel. A route switch control unit recognizes a section in which the channel that is not used for restoration has been established and a fault bypass control condition at the time of occurrence of a fault and performs a route switching control based on a result of recognition.

16 Claims, 22 Drawing Sheets

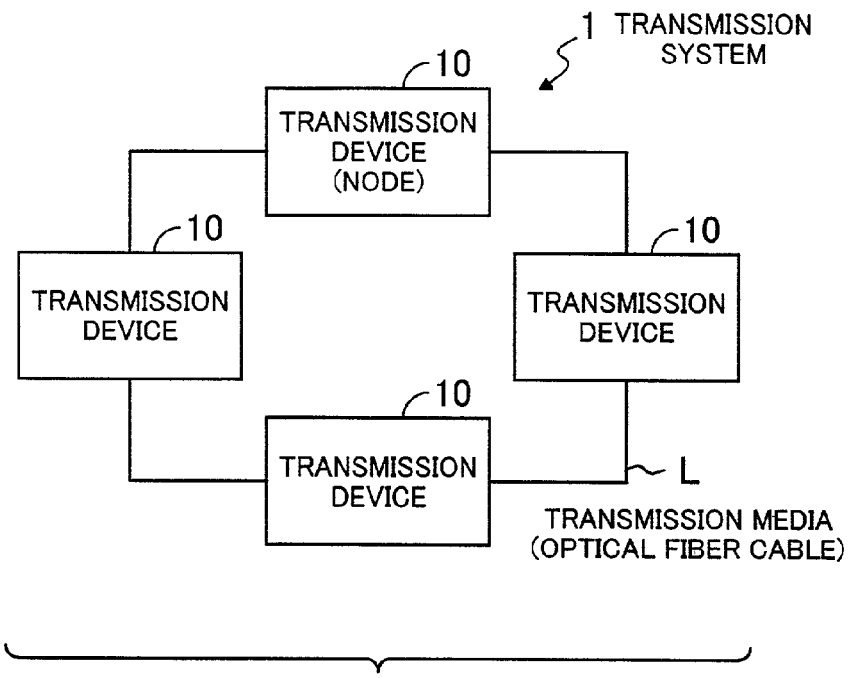
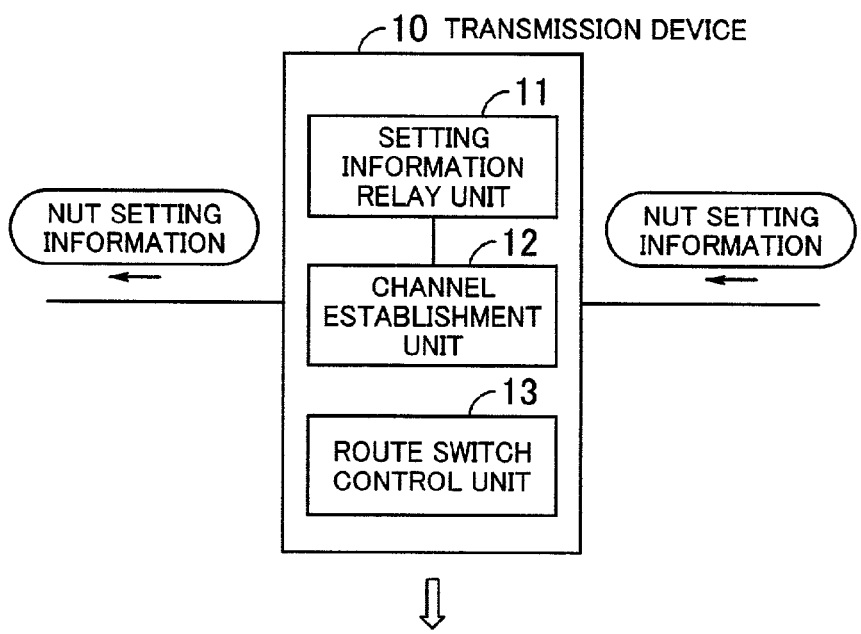
EX. WHEN NUT SETTING IS GIVEN TO CH 25 FROM NUT SETTING INFORMATION, NUT OF CH25 IS ESTABLISHED AND NUT RELAY INFORMATION IS RELAYED.
FIG. 1

D6#2 BYTE

BIT NO.

1: BIT INDICATING THAT DATA IS BEING UPDATED  $\begin{cases} \text{"0" WRITING BY CPU IS INHIBITED} \\ \text{"1" WRITING BY CPU IS ALLOWED} \end{cases}$

2: FIXED TO "1"

3: ODD PARITY BIT FOR BITS 4-8

4-8: 5 UPPER BITS OF SQUELCH TABLE AND NUT TABLE RAM.
THESE BITS INDICATE ADDRESS OF NUT TABLE RAM TOGETHER WITH BITS 4-8 OF D6#2

D5#2 BYTE

BIT NO.

1: PART EXCLUSIVELY USED BY SQUELCH TABLE

2: PART EXCLUSIVELY USED BY SQUELCH TABLE 3-8: SIX LOWER BIT OF ADDRESS OF SQUELCH TABLE AND NUT TABLE RAM.
THESE BITS INDICATE ADDRESS OF NUT TABLE RAM TOGETHER WITH BITS 4-8 OF D6#2

FIG. 10

D5#3 BYTE

BIT NO.

1-4: SCR.NODE ID (START NODE ID)

5-8: DST.NODE ID (END NODE ID)

D5#4 BYTE

BIT NO.

1: BIT INDICATING TYPE OF INFORMATION TO BE TRANSFERRED

1: SQUELCH TABLE

0: NUT SETTING INFORMATION

2: FIXED TO "1"

3-8: CRC6 Check code (BITS SUBJECTED TO CALCULATION: BITS 3-8 OF D5#2
BITS 1-8 OF D5#3)

FIG. 11

NEW BYTE

BIT NO.

1: BIT INDICATING TYPE OF NUT
  1: BASIC NUT
  0: ENHANCED NUT 2-3: BIT INDICATING NUT TABLE TRANSFER CONDITION
  00: NUT SETTING RELEASE CONDITION
  01: NUT SETTING RELEASE REQUEST CONDITION
  10: NUT SETTING ESTABLISHMENT CONDITION
  11: NUT SETTING ESTABLISHMENT REQUEST CONDITION

4: BIT INDICATING RELAY DIRECTION
  1: EAST TO WEST (EW)
  0: WEST TO EAST (WE)

5-6: GROUP IDENTIFIER, OC192 IS DIVIDED INTO FOUR GROUPS

7: FIXED TO "1"

8: ODD PARITY BIT FOR BITS 1-6

FIG. 12

| GROUP | RAM | SPAN | CH-NO. | ADD/DROP |
|---|---|---|---|---|
| 0 | 000 | 1 | 1 | ADD |
| 0 | 001 | 1 | 1 | DROP |
| 0 | 002 | 1 | 2 | ADD |
| 0 | 003 | 1 | 2 | DROP |
| 0 | 004 | 1 | 3 | ADD |
| 0 | 005 | 1 | 3 | DROP |
| ---- | ---- | ---- | ---- | ---- |
| 0 | 05E | 1 | 48 | ADD |
| 0 | 05F | 1 | 48 | DROP |
| 0 | 060 | 2 | 1 | ADD |
| 0 | 061 | 2 | 1 | DROP |
| ---- | ---- | ---- | ---- | ---- |
| 0 | 0BE | 2 | 48 | ADD |
| 0 | 0BF | 2 | 48 | DROP |
| ---- | ---- | ---- | ---- | ---- |
| 0 | 5A0 | 16 | 1 | ADD |
| 0 | 5A1 | 16 | 1 | DROP |
| ---- | ---- | ---- | ---- | ---- |
| 0 | 5FE | 16 | 48 | ADD |
| 0 | 5FF | 16 | 48 | DROP |

FIG. 13

| GROUP | RAM | SPAN | CH-NO. | ADD/DROP |
|---|---|---|---|---|
| 1 | 000 | 1 | 49 | ADD |
| 1 | 001 | 1 | 49 | DROP |
| ---- | ---- | ---- | ---- | ---- |
| 1 | 5FE | 16 | 96 | ADD |
| 1 | 5FF | 16 | 96 | DROP |
| 2 | 000 | 1 | 97 | ADD |
| 2 | 001 | 1 | 97 | DROP |
| ---- | ---- | ---- | ---- | ---- |
| 2 | 5FE | 16 | 144 | ADD |
| 2 | 5FF | 16 | 144 | DROP |
| 3 | 000 | 1 | 145 | ADD |
| 3 | 001 | 1 | 145 | DROP |
| ---- | ---- | ---- | ---- | ---- |
| 3 | 5FE | 16 | 192 | ADD |
| 3 | 5FF | 16 | 192 | DROP |

TRANSMISSION DEVICE

BACKGROUND OF THE INVENTION (1) Field of the Invention

The present invention relates to transmission devices, and more particularly, to a transmission device that performs a transmission control on a ring network.

(2) Description of the Related Art

As is known, SDH/SONET has been standardized as a signal hierarchy multiplexing system in digital transmission, and development of economical digital networks has been progressed. A BLSR (Bi-directional Line-Switched Ring) has been widely employed as a ring-shaped network configured by SONET nodes. The BLSR is a ring network in which each route between nodes is doubled in two ways, and if a fault occurs in one of the routes in two ways, the traffic flow is switched to the other route.

For a BLSR involved in OC-48 (2.488320 Gb/s) consisting of CH1 through CH48, CH1 through CH24 are assigned to the working path group, and CH24 through CH48 are assigned to the protection path group. That is, 24 channels are assigned to each path group, and half of the channels is ensured for protection.

A fault is bypassed in the BLSR as follows. If a fault occurs in a line including the working path group, all of the 24 channels of the working path group is forcedly replaced by the channels of the protection path group in the reverse direction. Even when some channels of the protection path group is used for communications, these channels are used to save the working path group.

The recent technology focuses on a fault restoration control called NUT (Non-preemptible Unprotected Traffic). By setting NUT, it is possible to avoid using some channels for restoration. In the above-mentioned example, if CH2 is set as NUT, CH2 is not switched for restoration. There are two types of NUT, a basic NUT and an enhanced NUT.

FIG. 21 is a diagram for explaining the basic NUT. Nodes 101-104 configure a BLSR network. Routes that connect two adjacent nodes among nodes 101-104 are spans Sp1-Sp4. In the basic NUT, NUT is set to a pair of channels in the working and protection path groups. NUT is also set to all spans of the ring network. For example, when CH1 in the working path group is placed out of a channel used for restoration, CH25 in the protection path group is also placed out of a channel for restoration. NUT is set to all of the spans Sp1-Sp4.

FIG. 22 is a diagram for exampling the enhanced NUT. NUT is set, on the span basis, to each of the individual channels in the working path group and each of the individual channels in the protection path group. For example, NUT may be set to only span Sp1 so that CH1 in the working path group is placed out of a channel used for restoration, and may be set to only span Sp2 so that CH48 in the protection path group is placed out of a channel for restoration.

However, the conventional NUT setting control cannot set NUT efficiently and easily because the operator is needed to provide each node with an instruction for setting NUT. In other words, the conventional NUT setting control does not employ an automatic configuration of setting NUT efficiently in the ring network.

There is also another disadvantage in that, if information used to set NUT is not correctly transferred to each node during establishment of the NUT setting because of a fault or the like, erroneous NUT setting may be established. This may degrade working efficiency and transmission quality.

SUMMARY OF THE INVENTION

Taking the above into consideration, an object of the present invention is to provide a transmission device capable of automatically configuring NUT setting efficiently and precisely.

The above object of the present invention is achieved by a transmission device performing transmission control on a ring network comprising: a setting information relay unit relaying setting information that places a specific channel out of a channel used for restoration; a channel establishment unit determining, by referring to the setting information, whether a channel of interest should be placed out of a channel for restoration and establishing the channel; and a route switch control unit recognizing a section in which the channel that is not used for restoration has been established and a fault bypass control condition at the time of occurrence of a fault and performing a route switching control based on a result of recognition.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 1 is a diagram of the principles of a transmission system according to the present invention;

FIG. 10 is a diagram of the content of each bit;

FIG. 11 is a diagram of the content of each bit;

FIG. 12 is a diagram of the content of each bit;

FIG. 13 is a diagram of a table that describes the correspondence between a write address and a NUT channel;

DESCRIPTION OF THE PREFERRED EMBODIMENTS

Figure 2:
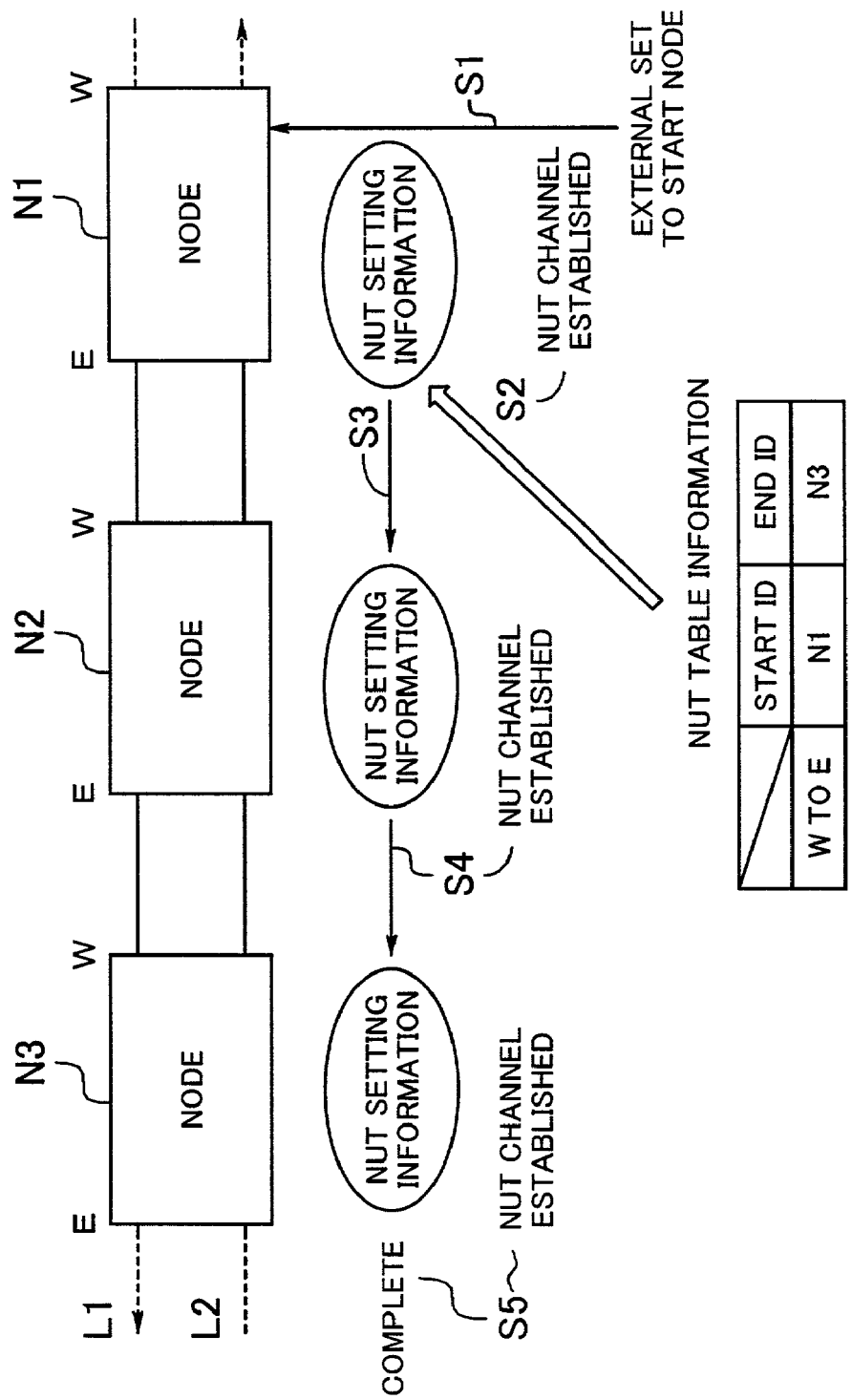
FIG. 2 is a diagram of an operation from setting of NUT to its establishment.

FIG. 1 is a diagram of the principles of a transmission system of the present invention. A transmission system 1 is a ring network in which transmission devices (nodes) 10 are coupled via transmission media L such as optical fiber cables in a ring shape. The transmission system 1 is capable of performing a control of channel restoration. The following description is directed to a case where the transmission system 1 of the present invention is applied to BLSR in the SONET ring.

Each of the transmission devices 10 is made up of a setting information relay unit 11, a channel establishment unit 12, and a route switch control unit 13. The setting information relay unit 11 relays setting information that indicates a specific channel to be unused for restoration. Hereinafter, NUT setting is defined as setting of a specific channel that is to be placed out of a channel used for restoration.

Setting information (NUT setting information) has NUT table information, which includes 1) a start transmission device ID and an end transmission device ID that define the start-end section in which NUT should be set to a channel, 2) information that indicates the type of NUT, namely, the basic NUT or the enhanced NUT, and 3) information that indicates the relay direction, namely, the east direction or west direction. The NUT setting information is inserted into D types out of the SONET overhead bytes (which will be described later with reference to FIGS. 9 through 12).

The channel establishment unit 12 refers to the NUT setting information and determines whether the transmission device having the present unit 12 should set NUT to the involved channel. If it is determined that NUT should be set, in other words, if it is determined that the present transmission device is located in the NUT establishment section, the unit 12 recognizes the channel to which NUT should be set via the designated write address into which table information should be written. In this manner, NUT to the involved channel is established. The information on the channel with NUT being established is retained in a register.

The route switch control unit 13 recognizes a fault bypass control condition in BLSR that is obtained in the NUT-established section and at the time of occurrence of a fault, and performs route switching based on the recognized result, as necessary. The route switch control unit 13 will be described with reference to FIG. 15 and some following figures.

Next, a description will be described of an operation from NUT setting to establishment. FIG. 2 is a diagram showing a sequence from NUT setting to establishment. FIG. 2 shows a part of a BLSR network in which transmission devices are connected in a ring formation via two links. Hereinafter, these transmission devices are referred to as nodes. Each of links L1 and L2 has the working path group and the protection path group.

A fault can be avoided or bypassed as follows. If a line fault occurs when the working path group of the link L1 is working, the fault is bypassed by the protection path group of the link L2. If a line fault occurs when the working path group of the link L2 is working, the fault is bypassed by the protection path group of the link L1. Here, the node N1 is the start node for NUT setting, and the node N3 is the end node therefore. The NUT setting and establishment is performed between the nodes N1 and N3.

At step S1, the operator describes NUT setting information in the start node N1. The NUT table information in the NUT setting information describes that the start node ID and the end node ID are respectively N1 and N3 and the relay direction is that from the west to the east.

At step S2, the channel establishment unit 12 in the node N1 establishes NUT to the involved channel on the basis of information externally set. The channel that is to be established as NUT is determined based on the write address for the NUT setting information (which will be described later with reference to FIGS. 13 and 14).

At step S3, the setting information relay unit 11 in the node N1 relays the NUT setting information. In this case, the information is relayed to the node located in the relay direction indicated by the NUT table information (in the case being considered, the information is relayed to the node N2 because the west-to-east direction is designated).

At step S4, the channel establishment unit 12 in the node N2 recognizes that its own is a node located in the NUT-established section from the relayed NUT setting information, and establishes a channel to which the NUT should be set. The setting information relay unit 11 refers to the NUT table information and sends the NUT setting information to the node N3 located in the direction indicated by the NUT table information.

At step S5, the channel establishment unit 12 in the node N3 recognizes that its own is a node located in the NUT-established section from the relayed NUT setting information, and establishes a channel to which the NUT should be set. The setting information unit 11 refers to the NUT table information and recognizes that its own node N3 is the end node, then stopping relaying the NUT setting information.

In the above-mentioned manner, the NUT setting information is externally set in the setting information relay unit 11 of the start node, so that the NUT setting information is relayed from the start node and the end node and the channel to which the NUT should be set can be established.

Figure 3:
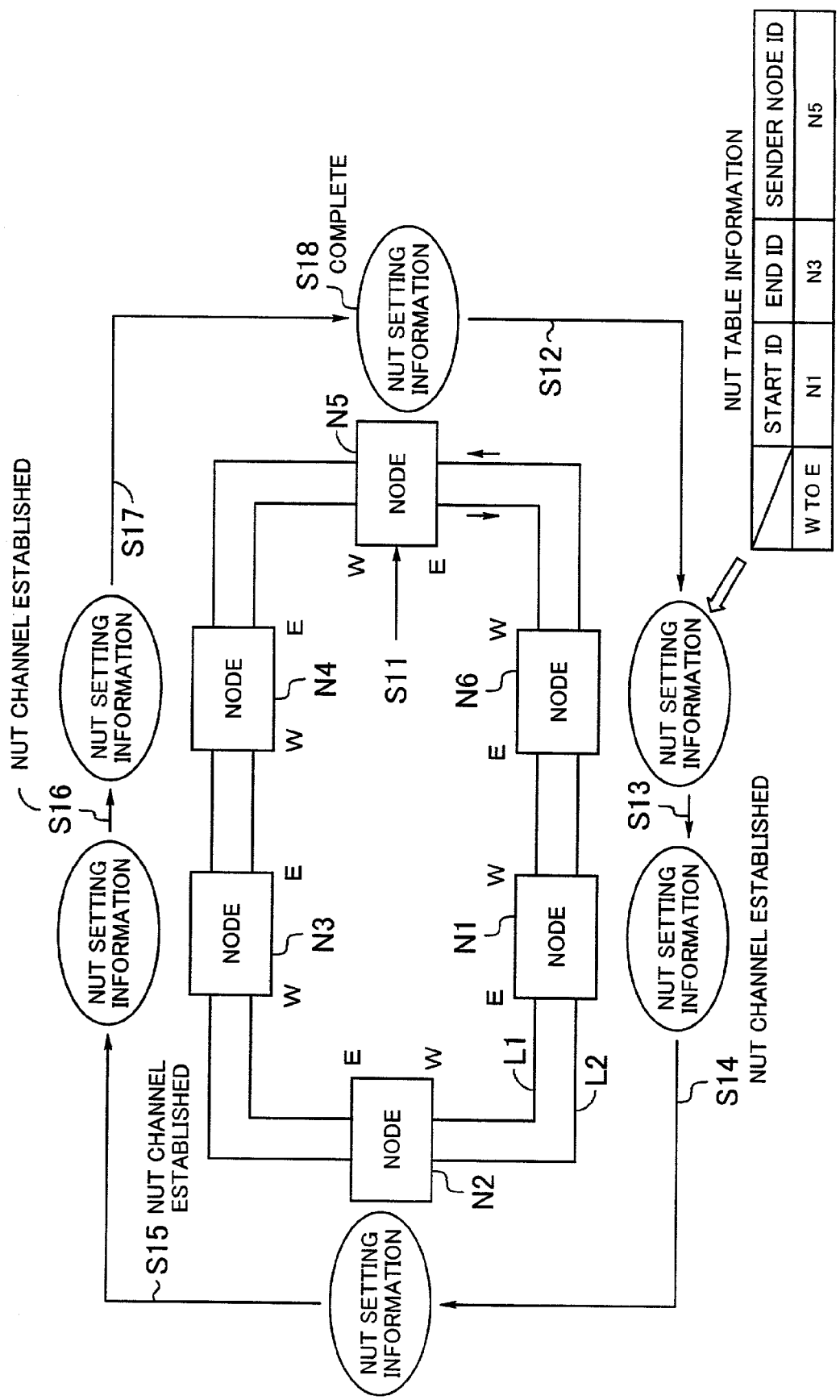
FIG. 3 is a diagram of an operation from setting of NUT to its establishment.

Next, a description will be given of an operation in which NUT setting information is set via an arbitrary node whereby a NUT channel is established between the designated sections. FIG. 3 is a diagram of a sequence between the NUT setting and establishment. FIG. 3 shows a BLSR network in which nodes N1-N6 are connected via links L1 and L2. In the following description, the node N1 is the start node for NUT setting, and the node N3 is the end node. Then, NUT is established between the nodes N1 and N3.

At step S11, the operator sets NUT setting information in the node N5 that is an arbitrary node. The NUT table information in the NUT setting information describes that the start ID and the end ID are respectively N1 and N3 and the relay direction is that from the west to the east. Further, the NUT table information has an item indicative of the sender node ID, which is N5 in the case being considered.

At step S12, the channel establishment unit 12 in the node N5 recognizes that its own is not a node located in the NUT-established section. The setting information relay unit 11 relays the NUT setting information. In this case, the NUT setting information is sent to the node located in the direction indicated by the NUT table information (node N6 since the west-to-east direction is designated).

At step S13, the channel establishment unit 12 of the node N6 recognizes, from the relayed NUT setting information, that its own is not a node located in the NUT-established section. The setting information relay unit 11 refers to the NUT table information and sends the NUT setting information to the node N1.

At step S14, the channel establishment unit 12 in the node N1 recognizes that its own is a node located in the NUT-established section from the relayed NUT setting information, and then establishes a channel to which NUT should be set. The setting information relay unit 11 refers to the NUT table information, and sends the NUT setting information to the node N2.

At step S15, the channel establishment unit 12 in the node N2 recognizes, from the relayed NUT setting information, that its own is a node located in the NUT-established section, and establishes a channel to which NUT should be set. The setting information relay unit 11 refers to the NUT table information, and sends the NUT setting information to the node N3.

At step S16, the channel establishment unit 12 in the node N3 recognizes, from the relayed NUT setting information, that its own is a node located in the NUT-established section, and establishes a channel to which NUT should be set. The setting information relay unit 11 refers to the NUT table information and recognizes that the sender node ID is N5. Therefore, the unit 11 relays the NUT setting information.

At step S17, the channel establishment unit 12 in the node N4 recognizes, from the relayed NUT setting information, that its own is not a node located in the NUT-established section. The setting information relay unit 11 recognizes, from the NUT table information, that the sender node ID is N5. Thus, the unit relays the NUT setting information.

At step S18, the setting information relay unit 11 in the node N5 receives the NUT setting information indicating that the sender node ID is N5, and recognizes that the NUT setting information has been circulated once. Then, the unit 11 stops relaying.

In the above-mentioned manner, the NUT setting information is relayed to all the nodes in the ring network from the setting information relay unit 11 in an arbitrary node, whereby the NUT channel can be established in the designated section.

Figure 4:
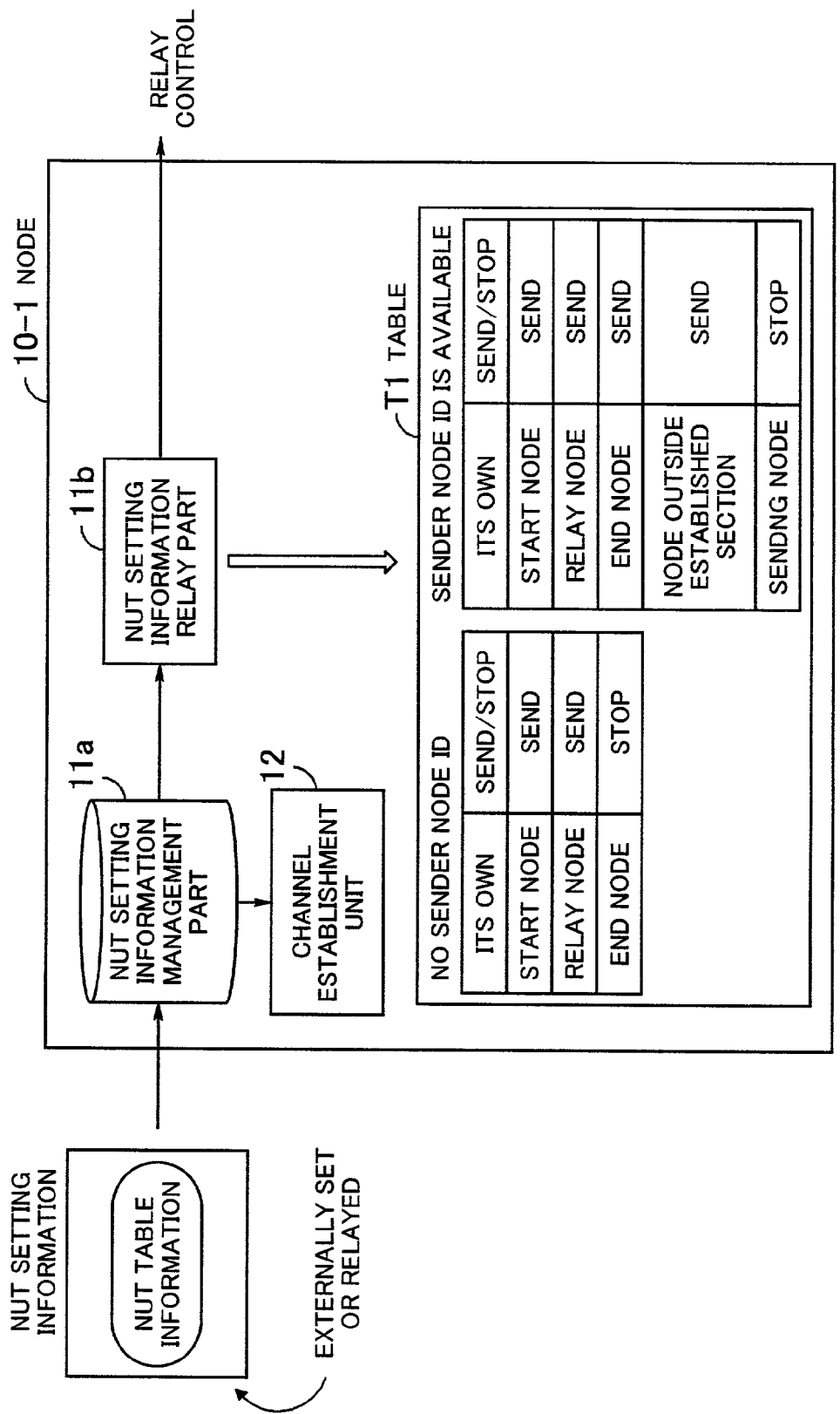
FIG. 4 is a diagram of a configuration of a node.

A description will now be given of a configuration of the node that operates as shown in FIGS. 2 and 3. FIG. 4 is a diagram of a configuration of the node. A node 10-1 shown in FIG. 4 includes a NUT setting information management part 11*a*, a NUT setting information relay part 11*b*, and the channel establishment unit 12. The NUT setting information management part 11*a* and the NUT setting information relay part 11*b* are included in the setting information relay unit 11.

The NUT setting information management part 11*a* stores and manages the NUT setting information (including the NUT table information) that is externally set or relayed. The channel establishment unit 12 establishes the NUT channel on the basis of the NUT setting information stored and managed.

The NUT setting information relay part 11*b* relays and controls the received NUT setting information on the basis of a table T1 shown in FIG. 4. The table T1 is primarily grouped into a case where the sender node ID is not available in the NUT table information and another case where the sender node ID is available therein.

In the case where no sender node ID is available, if the node of interest is the start node from which the NUT-established section starts or a node located in the NUT-established section, the node relays the NUT setting information. If the node of interest is the end node with which the NUT-established section ends, the node stops relaying.

In the case where the sender node ID is available, if the node of interest is the start node from which the NUT-established section starts or a node located in the NUT-established section, the node relays the NUT setting information. If the node of interest is the end node with which the NUT-established section ends or a node outside of the NUT-established section, the node relays the NUT setting information. If the node of interest is the sending node, it stops relaying the NUT setting information.

Figure 5:
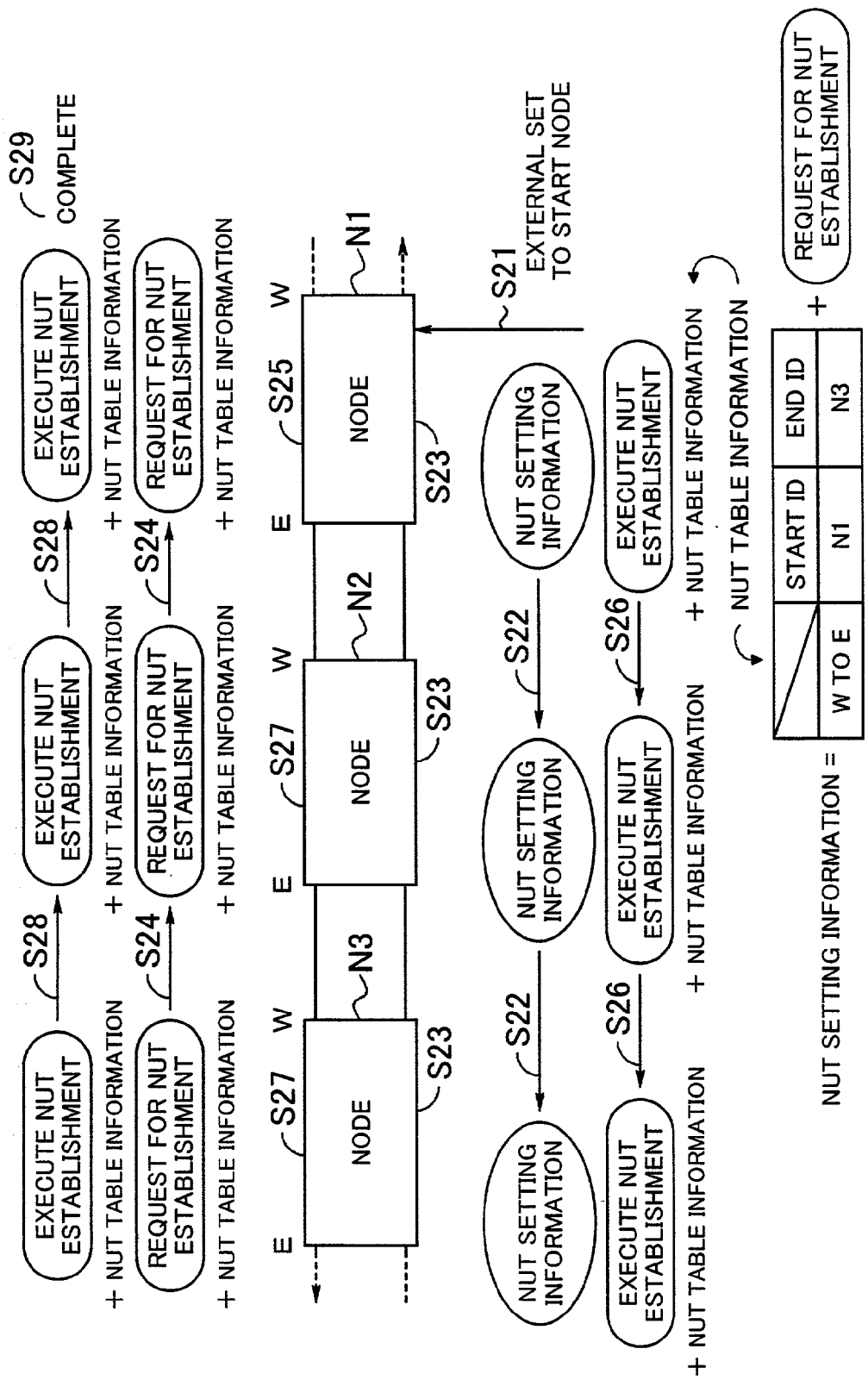
FIG. 5 is a diagram of an operation from setting of NUT to its establishment.

A case will now be described where a message for execution of establishment in response to a request for establishment of NUT is relayed and a NUT channel is established in the designated section. FIG. 5 is a diagram of a sequence from the setting of NUT to its establishment. The following description is directed to a case where the node N1 is the start node for NUT setting and the node N3 is the end node in a part of the BLSR network, NUT being established between the nodes N1 and N3.

At step S21, the operator sets the NUT setting information in the start node N1 so that the NUT table information in the NUT setting information describes that the start node ID and the end node ID are respectively N1 and N3 and the relay direction is that from the west to the east.

At step S22, the setting information relay unit 11 in the node N1 sends the NUT setting information to the node located in the relay direction indicated by the NUT table information. The above NUT setting information includes a message of a request for establishment of NUT. The NUT setting information including the above request is sent to the end node N3 via the node N2.

At step S23, each of the nodes N1-N3 retains information necessary for NUT establishment such as the NUT table information.

At step S24, the setting information relay unit 11 of the node N3 sends a NUT establishment request back to the node N1 via the node N2 as a response.

At step S25, when the node N1 receives the NUT establishment request, its channel establishment unit 12 establishes NUT to the corresponding channel.

At step S26, the setting information relay unit 11 sends the NUT setting information including the message indicating execution of NUT establishment to the end node N3 via the node N2.

At step S27, the nodes N2 and N3 receive the execution of NUT establishment, the respective channel establishment units 12 establish the NUT channel based on the retained information.

At step S28, the node N3 establishes the NUT channel, and its setting information relay unit 11 sends the execution of NUT establishment back to the node N1 via the node N2.

At step S29, when the setting information relay unit 11 in the node N1 receives the execution of NUT establishment, the unit 11 deems the NUT channel to have been established and stops relaying.

Figure 6:
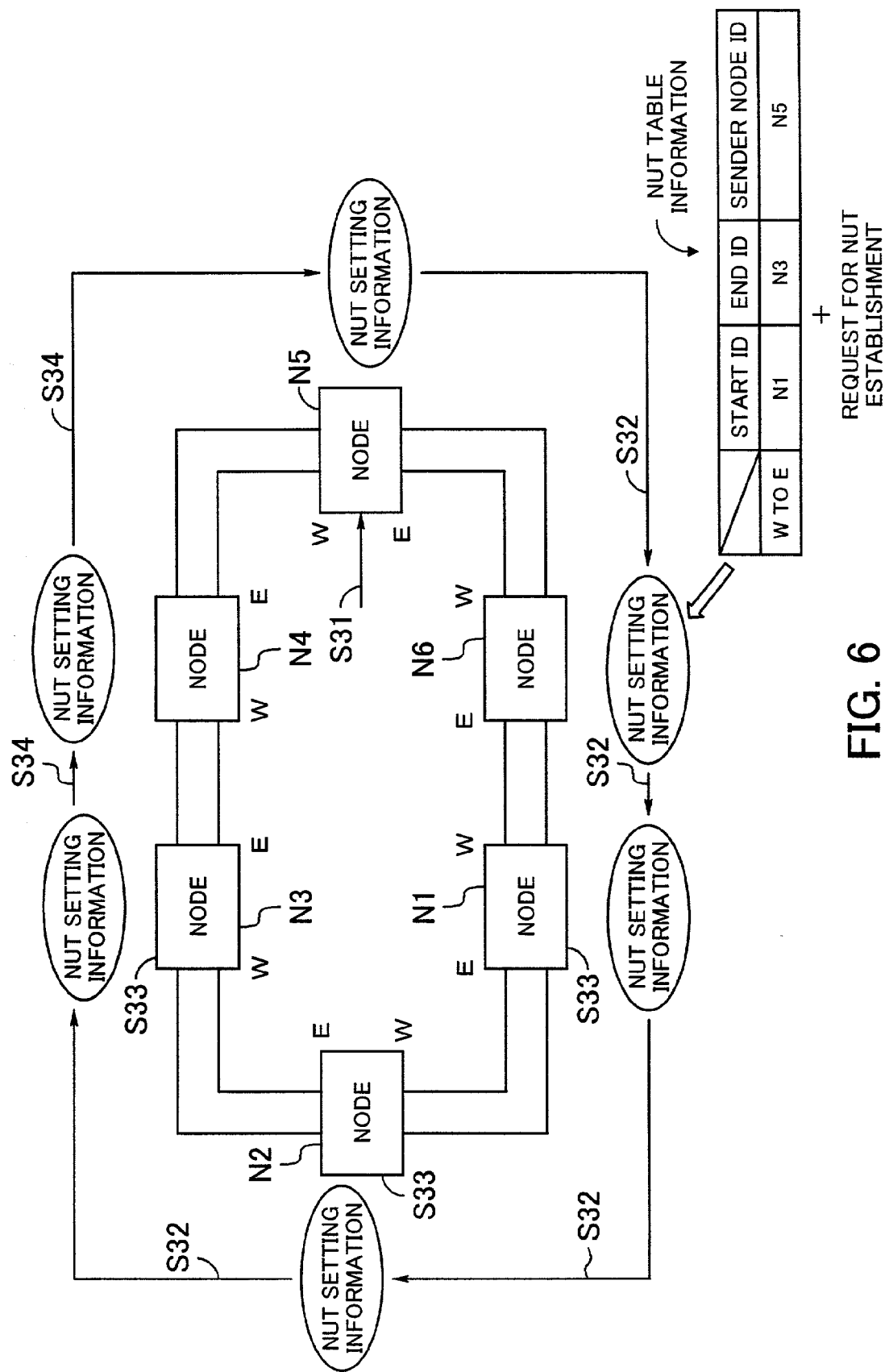
FIG. 6 is a diagram of an operation from setting of NUT to its establishment.
Figure 7:
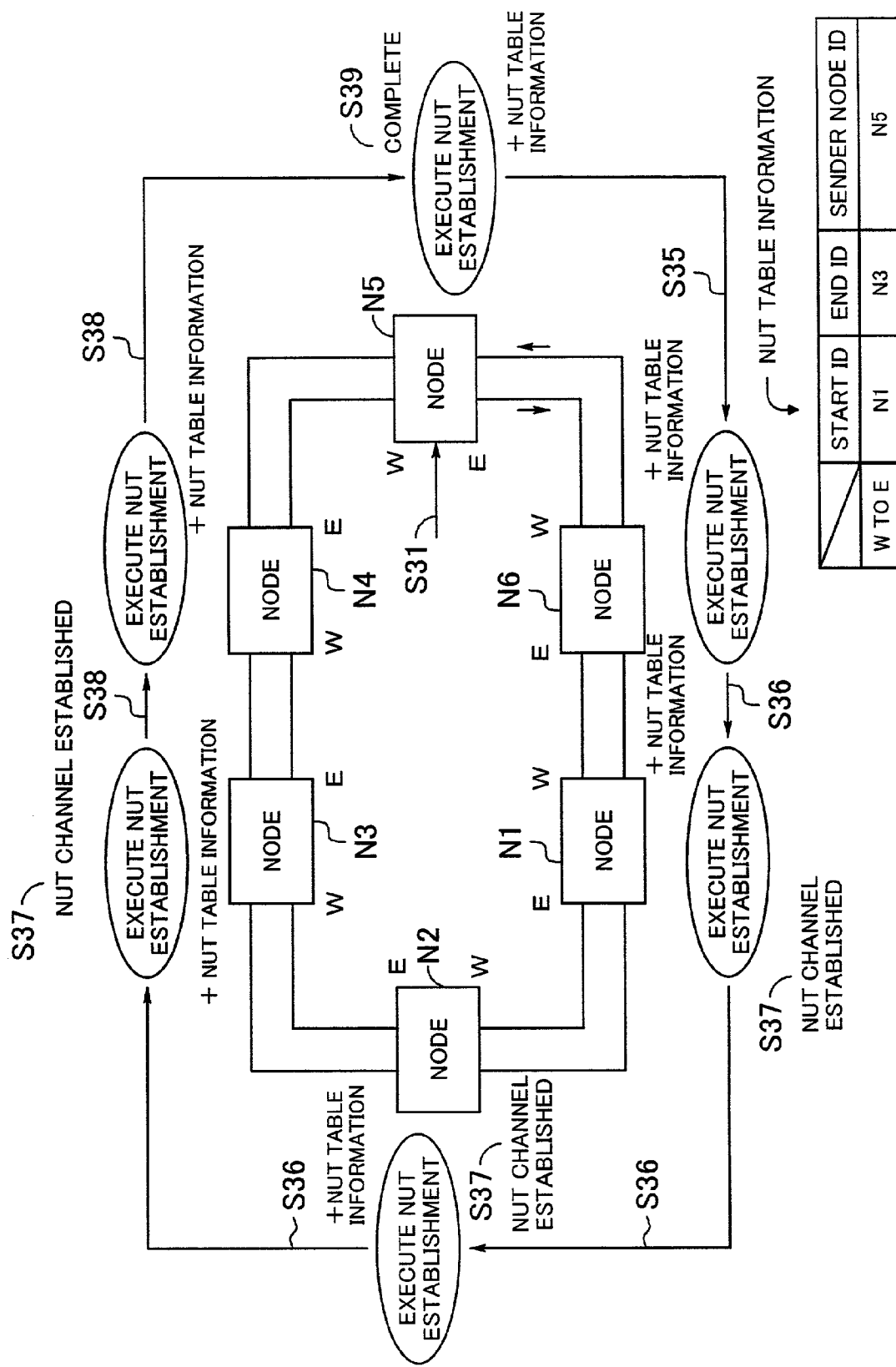
FIG. 7 is a diagram of an operation from setting of NUT to its establishment.

Next, a description will be given of an operation in which NUT setting information is set via an arbitrary node, and a message for execution of establishment in response to a request for establishment of NUT is relayed, so that a NUT channel can be established in the designated section. FIGS. 6 and 7 are diagrams of a sequence from the setting of NUT and its establishment.

FIGS. 6 and 7 illustrate a BLSR network in which nodes N1-N6 are connected in a ring formation. The following description is directed to a case where the node N1 is the start node for NUT setting and the node N3 is the end node in the BLSR network, NUT being established between the nodes N1 and N3. FIG. 6 shows steps S31-S34 of the sequence, and FIG. 7 shows steps S35-S39 thereof.

At step S31, the operator sets the NUT setting information in the node N5 that is an arbitrary node. The NUT table information in the NUT setting information describes that the start node ID and the end node ID are respectively N1 and N3 and the relay direction is that from the west to the east. Further, the NUT table information has an item indicative of the sender node ID, which is N5 in the case being considered.

At step S32, the setting information relay unit 11 in the node N1 sends the NUT setting information including a message for a request for establishment of NUT to the node located in the relay direction indicated by the NUT table information. The NUT setting information including the request for NUT establishment is sent to the end node N3 via the nodes N6, N1 and N2.

At step S33, the nodes N1-N3 retain information necessary for NUT setting such as the NUT table information.

At step S34, the setting information relay unit 11 in the node N3 recognizes that the sender node ID is N5 from the NUT table information, and relays the NUT setting information including the request for NUT establishment via the node N4.

At step S35, the node N5 receives the NUT setting information including the request for NUT establishment, its setting information relay unit 11 sends the NUT setting information including execution of NUT establishment.

At step S36, the execution of NUT establishment is sent to the end node N3 via the nodes N6, N1 and N2.

At step S37, the nodes N1-N3 receives the establishment of NUT execution, the respective channel establishment units 12 establish the NUT channel on the basis of the retained information.

At step S38, the node N3 establishes the NUT channel, and then sends the NUT setting information including the execution of NUT establishment back to the node N5 via the node N4.

At step S39, when the setting information relay unit 11 of the node N5 receives the execution of NUT execution, it deems the NUT channel to have been established, and stops relaying.

As described above, the setting information relay unit 11 sends the NUT setting information including the message of the request for establishment, and sends the establishment execution message after receiving the returned normal response. The channel establishment unit 12 in the node that receives the establishment execution message establishes the NUT channel. Thus, it is possible to prevent occurrence of an erroneous operation such that erroneous NUT setting is established when information necessary for NUT setting is not correctly propagated due to a fault or the like.

Figure 8:
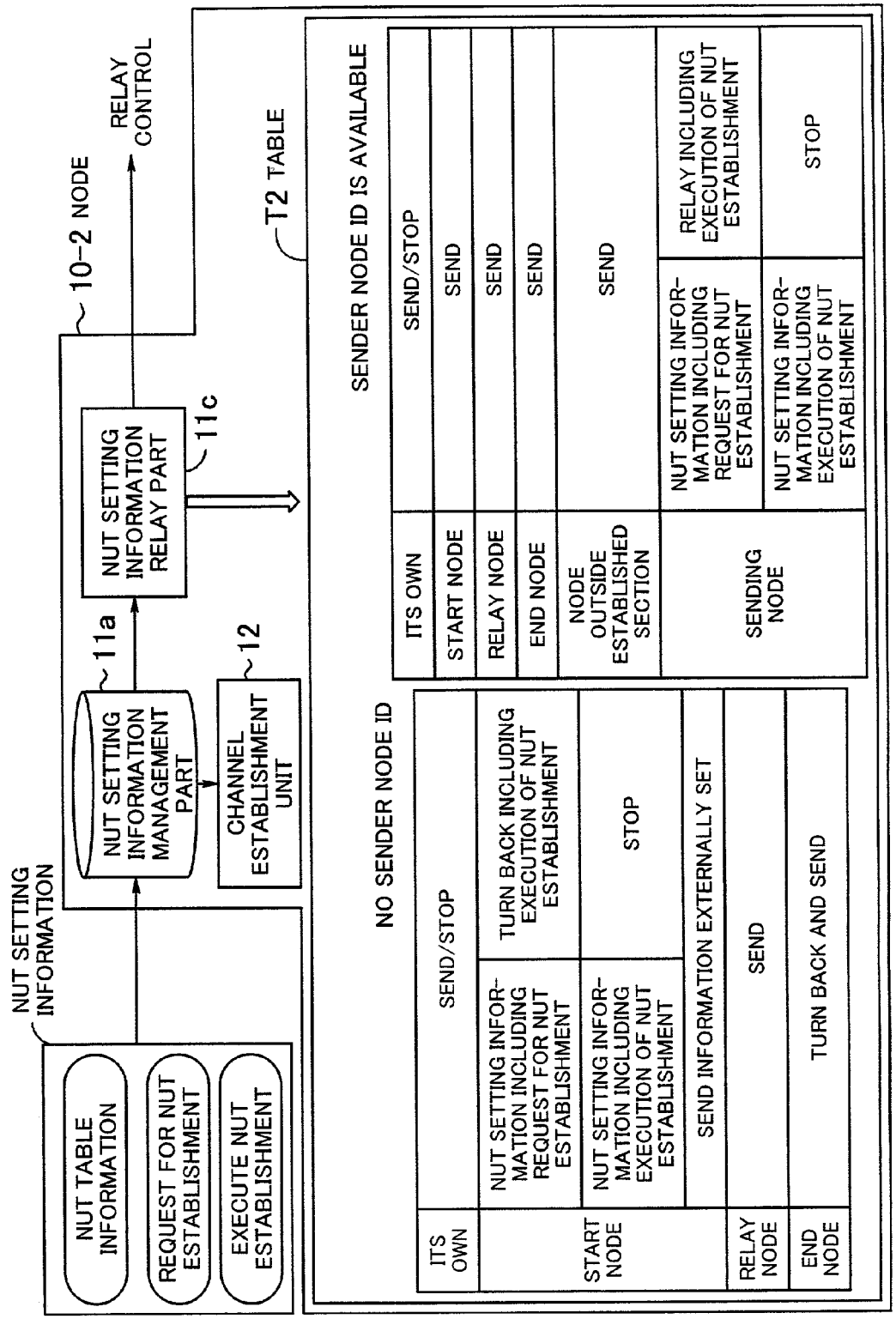
FIG. 8 is a diagram of a configuration of a node.

A description will now be given of a node configuration that conforms to the operation shown in FIGS. 5 through 7. FIG. 8 is a diagram of a node configuration. A node 10-2 sown in FIG. 8 includes the NUT setting information management part 11a, a NUT setting information relay part 11c, and the channel establishment unit 12. The NUT setting information management part 11a and the NUT setting information relay part 11c are included in the setting information relay unit 11.

The NUT setting information management part 11a stores and manages the NUT setting information (including the NUT table information) that is externally set or relayed. The channel establishment means 12 establishes the NUT channel on the basis of the NUT setting information stored and managed.

The NUT setting information relay unit 11c relays and controls the received NUT setting information (NUT table information, request for NUT establishment, and execution of NUT establishment) on the basis of a table T2. The table T2 is primarily grouped into a case where the sender node ID is not available in the NUT table information and another case where the sender node ID is available therein.

In the case where no sender node ID is available, if the node of interest is the start node from which the NUT-established section starts, the NUT setting information is processed as follows. When the NUT setting information is externally set, it is sent. When the NUT setting information that is turned back and relayed includes the request for NUT establishment, the NUT setting information is turned back including the execution of NUT establishment. When the NUT setting information that is turned back and relayed includes the execution of NUT establishment, transmission is stopped. If the node of interest is a node located in the NUT-established section, the NUT setting information is relayed. If the node of interest is the end node with which the NUT-established section ends, the NUT setting information is turned back and sent.

In the case where the sender node ID is available, if the node of interest is the start node from which the NUT-established section starts or a node located in the NUT-established section, the node relays the NUT setting information. If the node of interest is the end node with which the NUT-established section ends or a node outside of the NUT-established section, the node relays the NUT setting information.

In the case where the node of interest is the sending node, if the relayed NUT setting information includes the request for NUT establishment, the NUT setting information is relayed together with execution of NUT establishment. If the relayed NUT setting information includes the execution of NUT establishment, the relay of the NUT setting information is stopped.

In the above description, the NUT channel is established by transferring the NUT setting information between the nodes that are parts of the ring network. Alternatively, each node may individually set NUT from maintenance terminal equipment. Also, in the foregoing, information from the request for NUT establishment to execution thereof is relayed to thus establish the NUT channel. The establishment of NUT can be efficiently released similarly by relaying a request for release.

Figure 9:
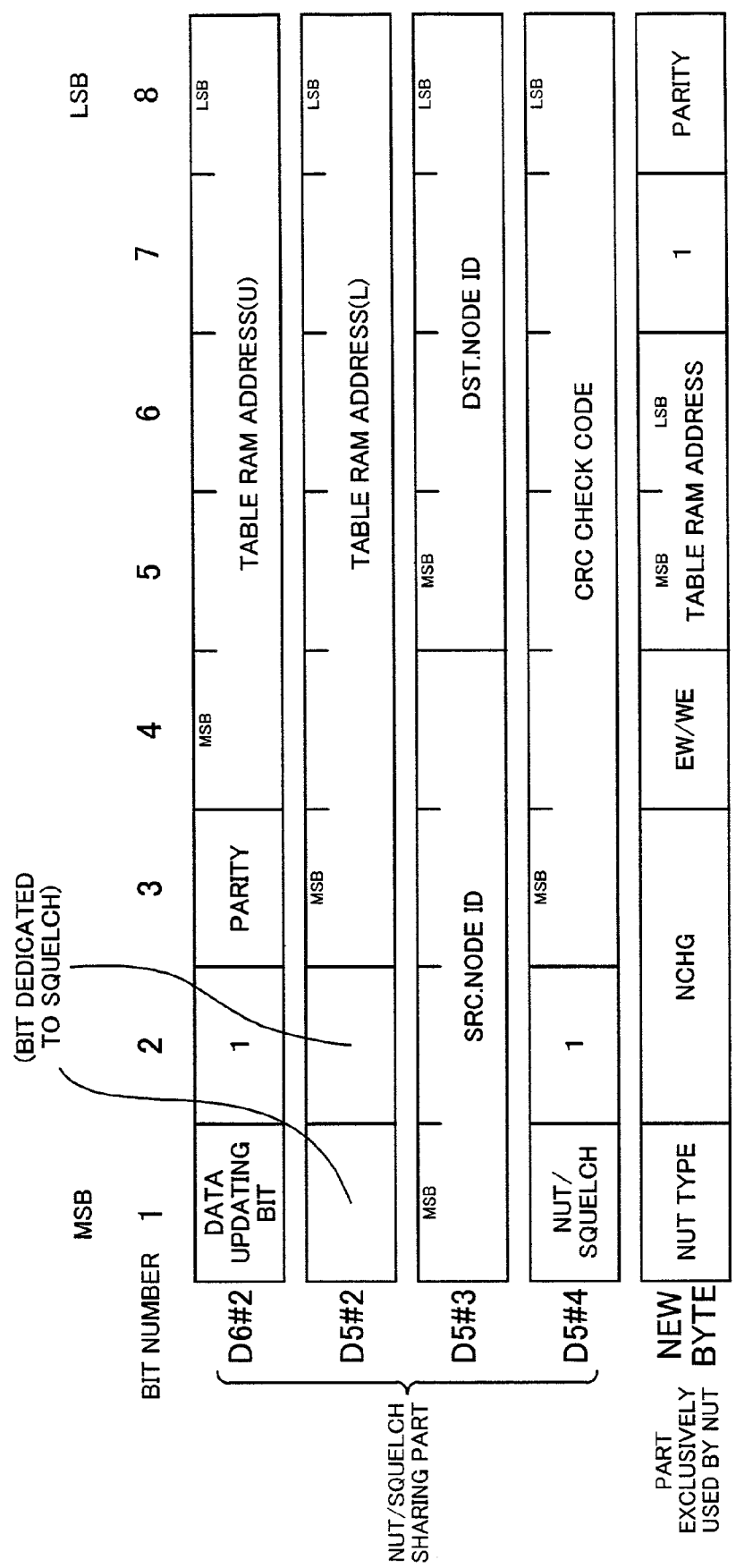
FIG. 9 is a diagram of a format of NUT setting information.

A format of the NUT setting information is described below. FIG. 9 is a diagram of the NUT setting information, which is inserted into the D bytes out of the SONET overhead bytes and is relayed between the nodes.

In the BLSR network, a control called squelch is performed. When multiple faults occur in the BLSR network, which is broken, some signals do not arrive at the target nodes. These signals may be sent to other nodes by switch or bridge. In this case, since the signals do not reach the target nodes, the signals are replaced by path alarm indication signals (AIS-P). The above control is called squelch.

Information about squelch is sent by using the D bytes. The NUT information of the present invention uses the D bytes while sharing a squelch table. The details of squelch do not directly relate to the present invention, and a description thereof will be omitted here.

In FIG. 9, D6#2, D5#2, D5#3 and D5#4 are commonly used for transmission of the NUT setting information and the squelch table. An idle (new) byte is exclusively used for transmission of the NUT setting information.

FIGS. 10 through 12 show the contents of the D bytes. Bit 1 of the D6#2 byte indicates updating of data, and is "0" while data is being updated so that the NUT setting information is inhibited from being written. Bit 2 of the D6#2 byte is fixed to "1", and bit 3 thereof is an odd parity bit for bits 4-8. The bits 4-8 indicate the addresses of the squelch table and a NUT table RAM (which will be described later with reference to FIGS. 13 and 14).

Bits 1 and 2 of the D5#2 byte are exclusively used for the squelch table (the contents thereof are omitted), and bits 3-8 are the six lower bits of the addresses of the squelch table and the NUT table RAM. The address of the NUT table RAM consists of bits 3-8 of the D5#2 byte and bits 4-8 of the D6#2 byte (11 bits).

Bits 1-4 of the D5#3 byte shown in FIG. 11 indicate the start node ID, and bits 5-8 thereof indicate the end node ID.

Bit 1 of the D5#4 byte indicates the type of information transferred. More particularly, "1" of bit 1 of the D5#4 byte indicates the squelch table, and "0" thereof indicates the NUT setting information. Bit 2 of the D5#4 byte is fixed to "1". Bits 3-8 indicate a CRC6 check code for bits 3-8 of D5#2 and bits 1-8 of D5#3.

Bit 1 of the new byte shown in FIG. 12 indicates the type of NUT. More particularly, "1" of bit new byte indicates the basic NUT, and "0" thereof indicates the enhanced NUT. Bits 2-3 of the new byte indicate the state of transfer of the NUT table. More particularly, bits 2-3 of the new byte indicate a NUT setting releasing state, and "01" indicates a NUT setting release request state, "10" indicating a NUT setting establishment state, and "11" indicating a NUT setting establishment request state. Bit 4 of the new byte indicates the relay direction. More particularly, "1" indicates the east-to-west direction, and "0" indicates the west-to-east direction. Bits 5-6 are a group identifier. The optical carrier level OC192 is divided into four groups each consisting of 48 levels (this will be described later with reference to FIGS. 13 and 14). Bit 7 is fixed to "1", and bit 8 is an odd parity bit for bits 1-6. The above-mentioned format does not include the sender node ID. When the NUT setting is performed via an arbitrary node, bits of another idle byte among the D bytes are used for insertion of the sender node ID.

Figure 14:
FIG. 14 is a diagram of a table that describes the correspondence between a write address and a NUT channel.

FIGS. 13 and 14 show a table that describes the correspondence between the write address and the NUT channel. A table T3 is owned by each node, and includes items of group, RAM (NUT table RAM), span, CH-No. (channel number), and Add/Drop. The table T3 handles the optical carrier levels from OC 48 to OC192 (9.953280 Gb/s).

Groups 0-3 are defined by equally dividing 192 channels of OC192 into four groups. Group 0 consists of CH1-CH48, and group 1 consists of CH49-CH96, while group 2 consists of CH97-CH144 and group 3 consists of CH145-CH192.

For example, group 0 of the table T3 is used for the BLSR network of OC48, and all of groups 0-3 are used for the OC192 BLSR network. Each group is designated by bits 5 and 6 of the new byte shown in FIG. 9.

The RAM indicates the write address of the RAM in which the NUT table information is stored, and corresponds to bits 4-8 of the D6#2 byte shown in FIG. 9 and bits 3-8 of the D5#2 byte.

The span indicates the set of SONET lines between two adjacent nodes. Since the BLSR network can be formed by 16 nodes at maximum, the span assumes 1-16. The item CH-No. indicates a channel to which NUT should be set. The item Add/Drop indicates add/drop for tributary.

For example, CH1 of span 1 is established as a NUT channel when the received NUT setting information indicates that bits 5 and 6 of the new byte indicate group 0, and bits 4-8 of the D6#2 byte and bits 3-8 of the D5#2 byte designate a write address 000.

Figure 15:
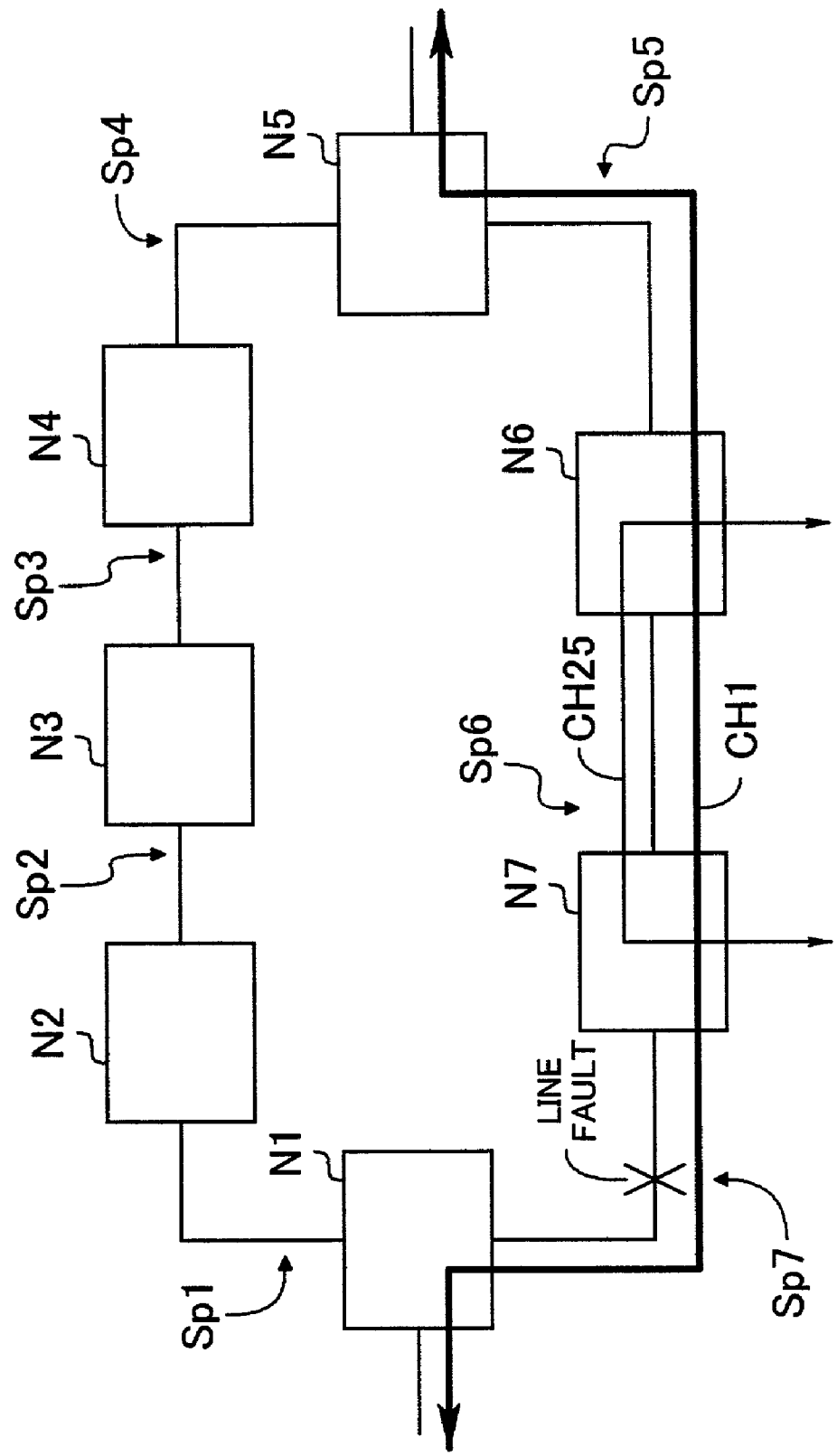
FIG. 15 is a diagram of the operation of a route switch control unit.
Figure 16:
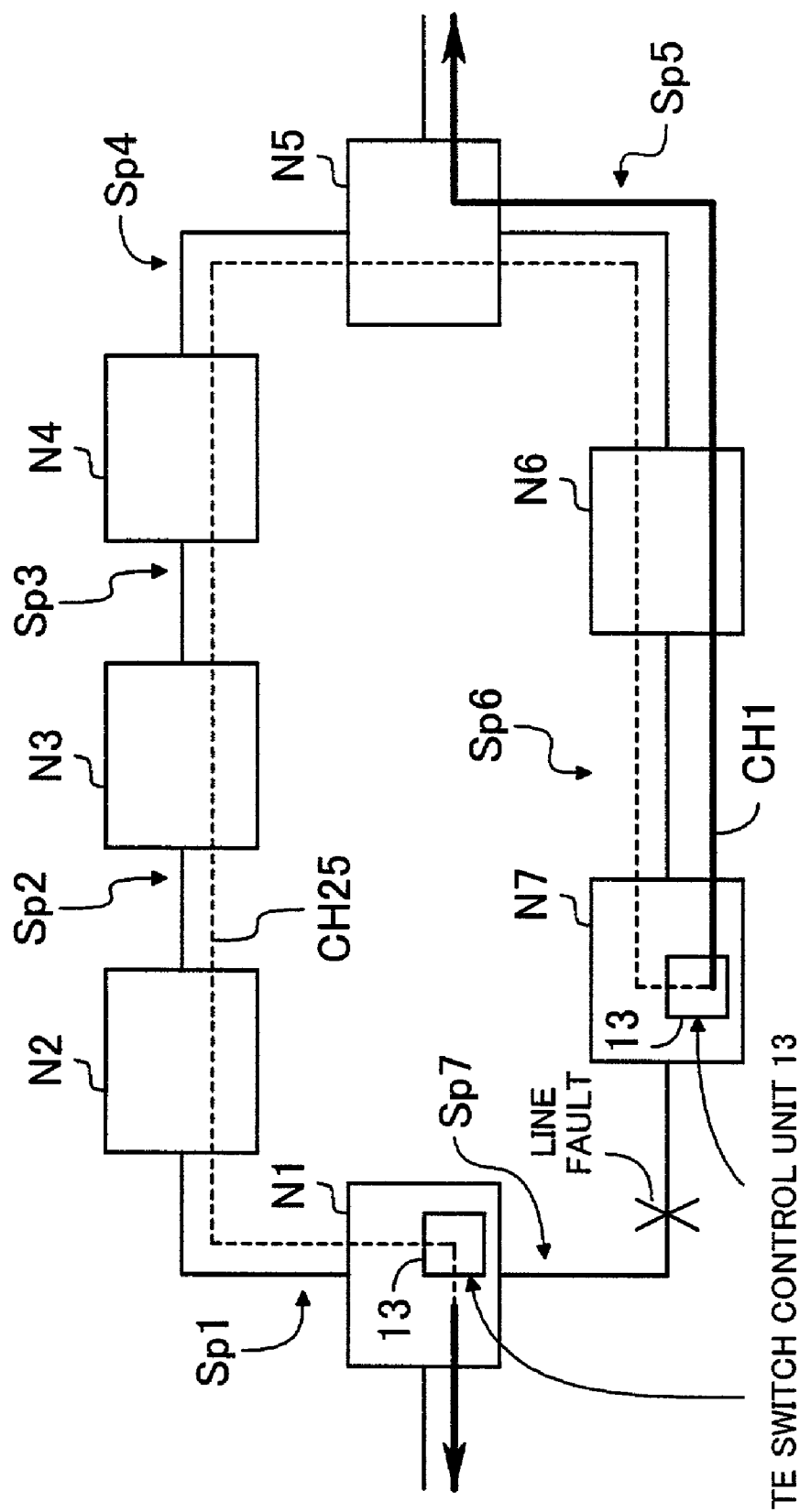
FIG. 16 is a diagram of the operation of the route switch control unit.
Figure 17:
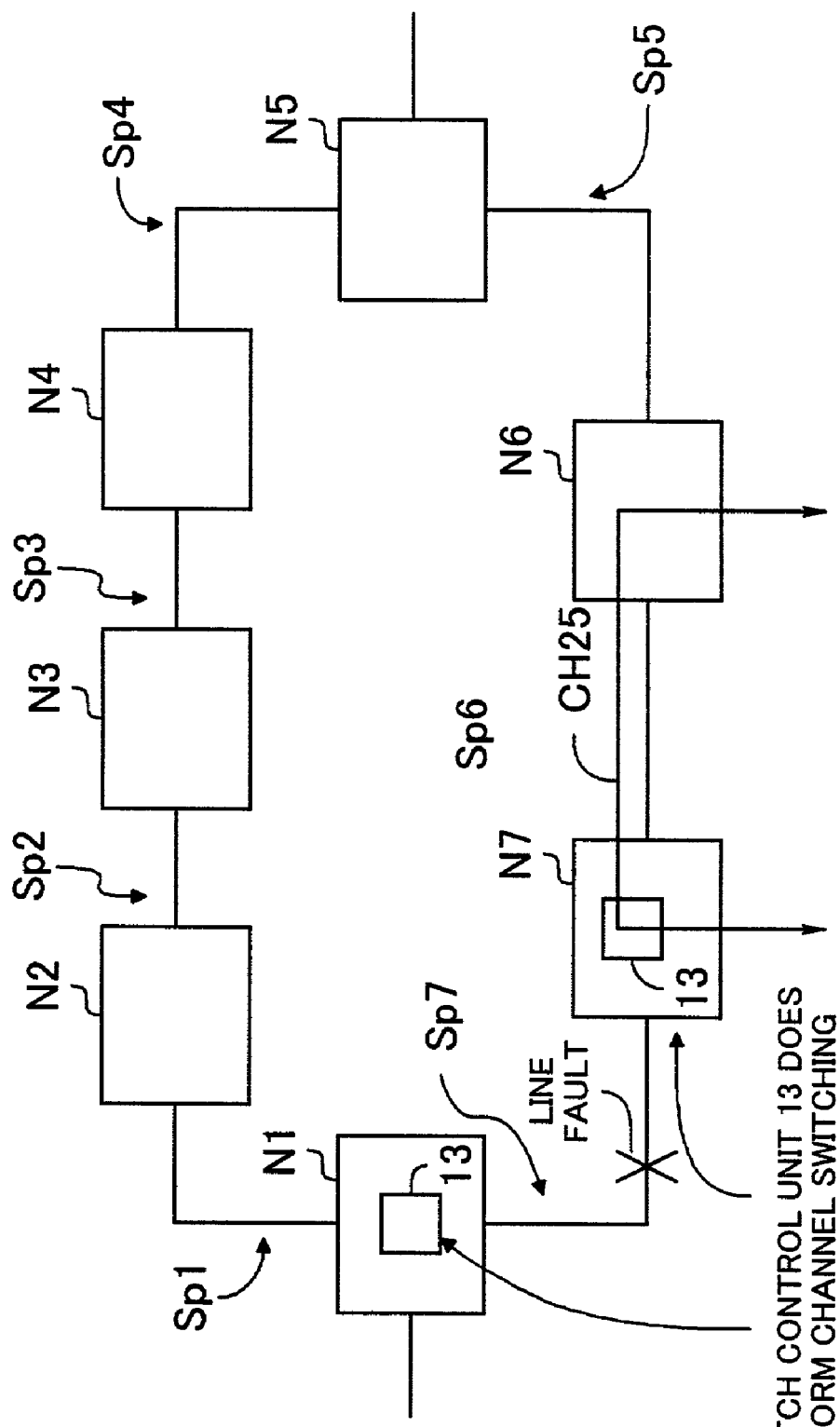
FIG. 17 is a diagram of the operation of the route switch control unit.

The route switch control unit 13 is described below. FIGS. 15 through 17 are diagrams for explaining the operation of the route switch control unit 13. FIGS. 15 through 17 show an application of the present invention to a fault end switching method in which line switching is performed at end nodes adjacent to the fault in order to bypass the fault in the BLSR network.

The BLSR network shown in FIGS. 15 through 17 has nodes N1-N7 connected in the ring formation, and spans Sp1-Sp7 are defined as routes between the nodes. As shown in FIG. 15, the nodes N1 and N5 communicate with each other via nodes N6 and N7 using CH1. In span Sp6, CH25 has been established as a NUT channel. The following description is directed to a case where a line fault occurs in span Sp7.

As shown in FIG. 16, if NUT is not set to the BLSR network, the route switch control units 13 of the end nodes N1 and N7 adjacent to the fault switch the channel from CH1 to CH25 as indicated by the broken line, so that the fault can be bypassed.

In the above case, CH25 is set as the NUT channel in span Sp6 between the nodes N6 and N7. Thus, as shown in FIG. 17, the route switch control units 13 of the nodes N1 and N7 give priority to NUT setting, and do not switch the channel from CH1 to CH25. That is, working of CH25 is given higher priority than bypass control needed for the fault that places CH1 out of service. Therefore, even when a fault occurs in span Sp7, drop to the tributary as shown is enabled between the nodes N6 and N7 using CH25.

Figure 18:
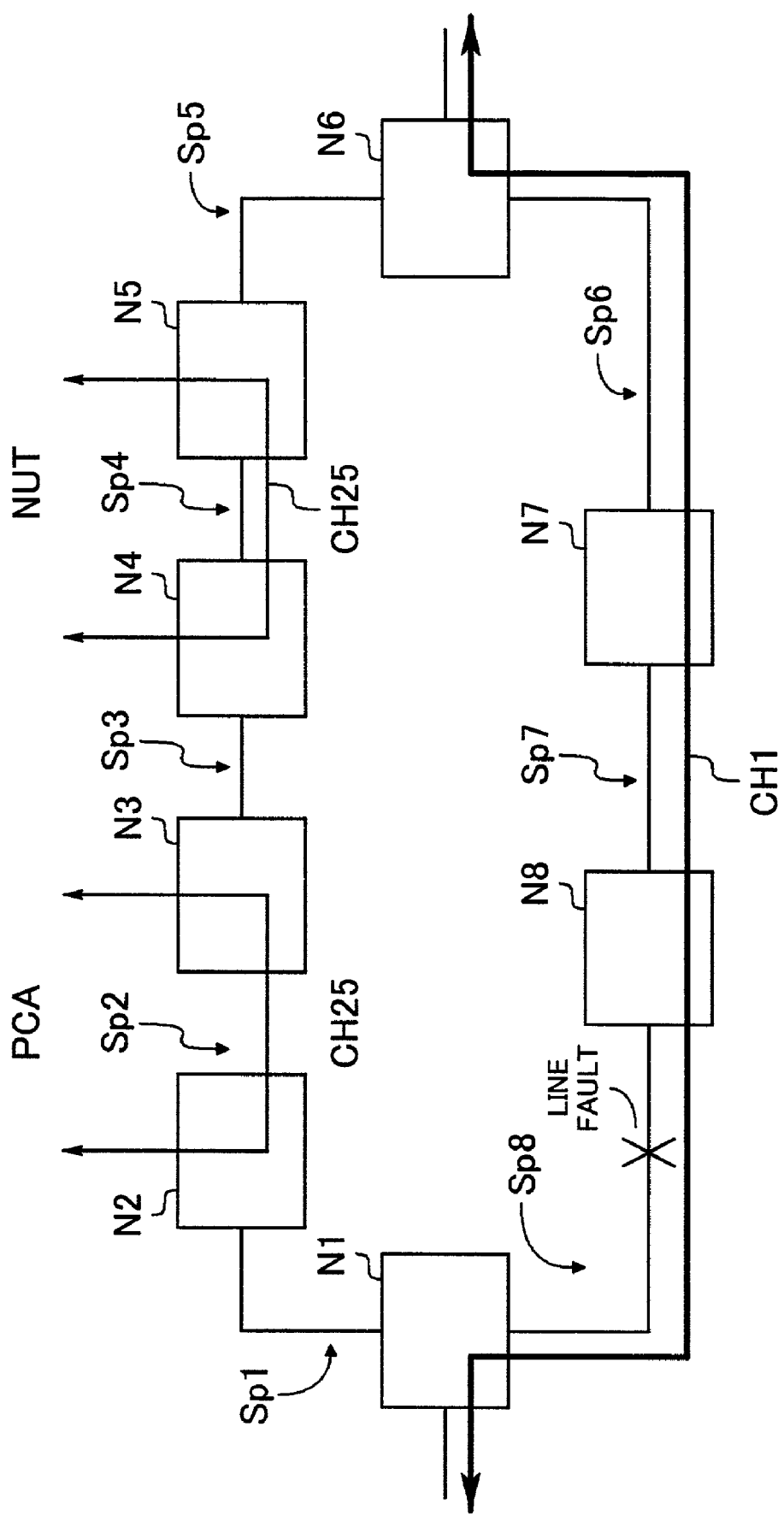
FIG. 18 is a diagram of the operation of the route switch control unit.
Figure 19:
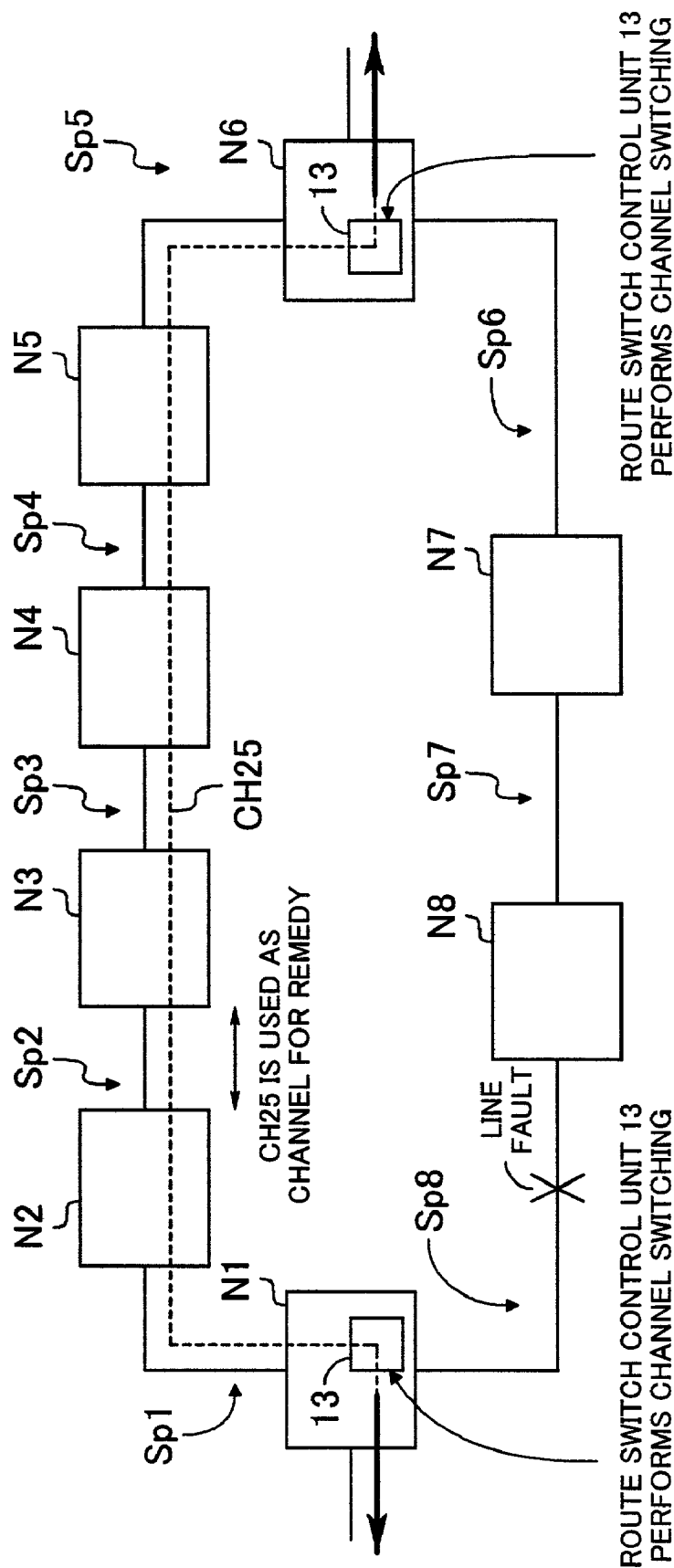
FIG. 19 is a diagram of the operation of the route switch control unit.
Figure 20:
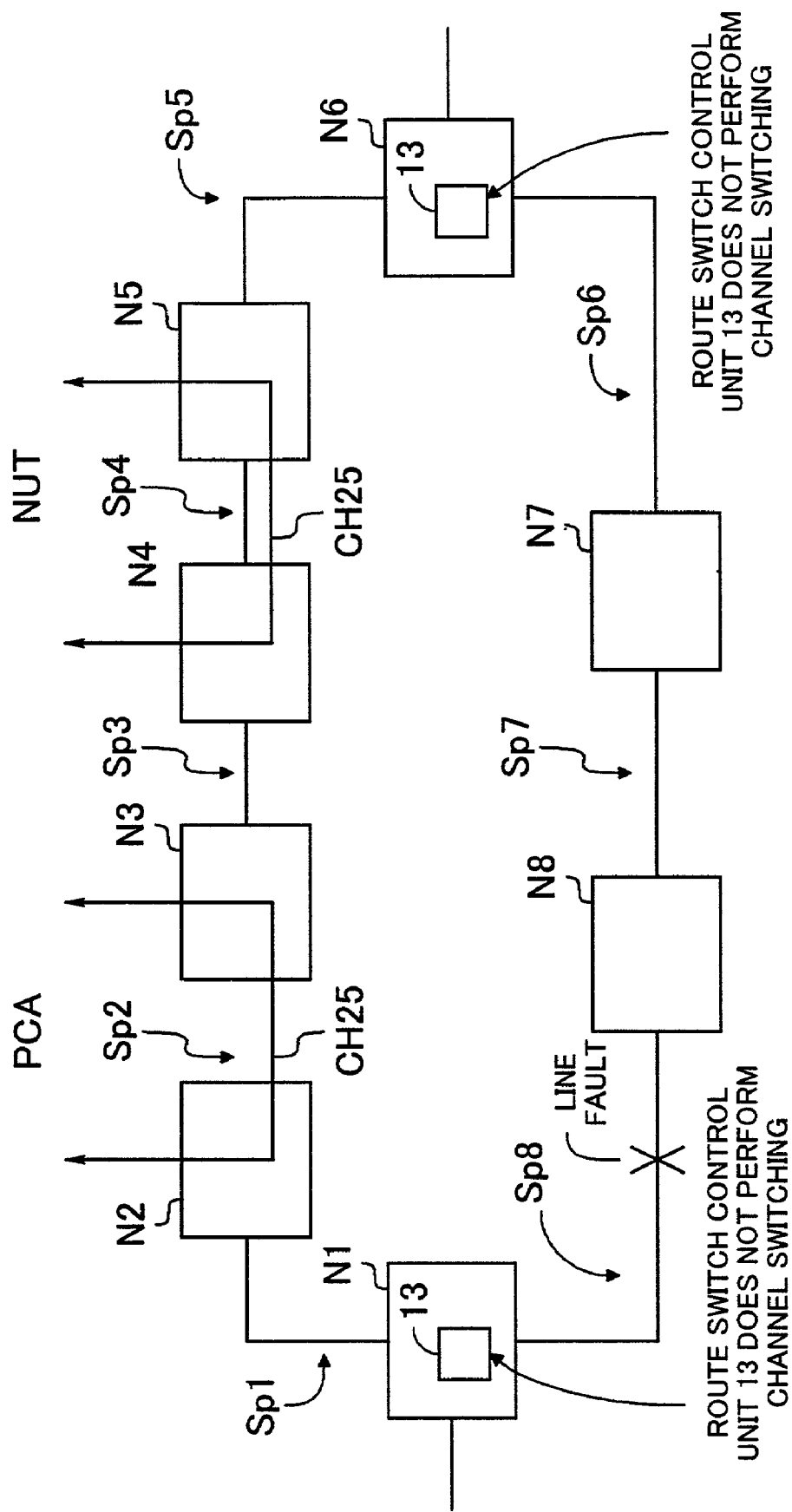
FIG. 20 is a diagram of the operation of the route switch control unit.
Figure 21:
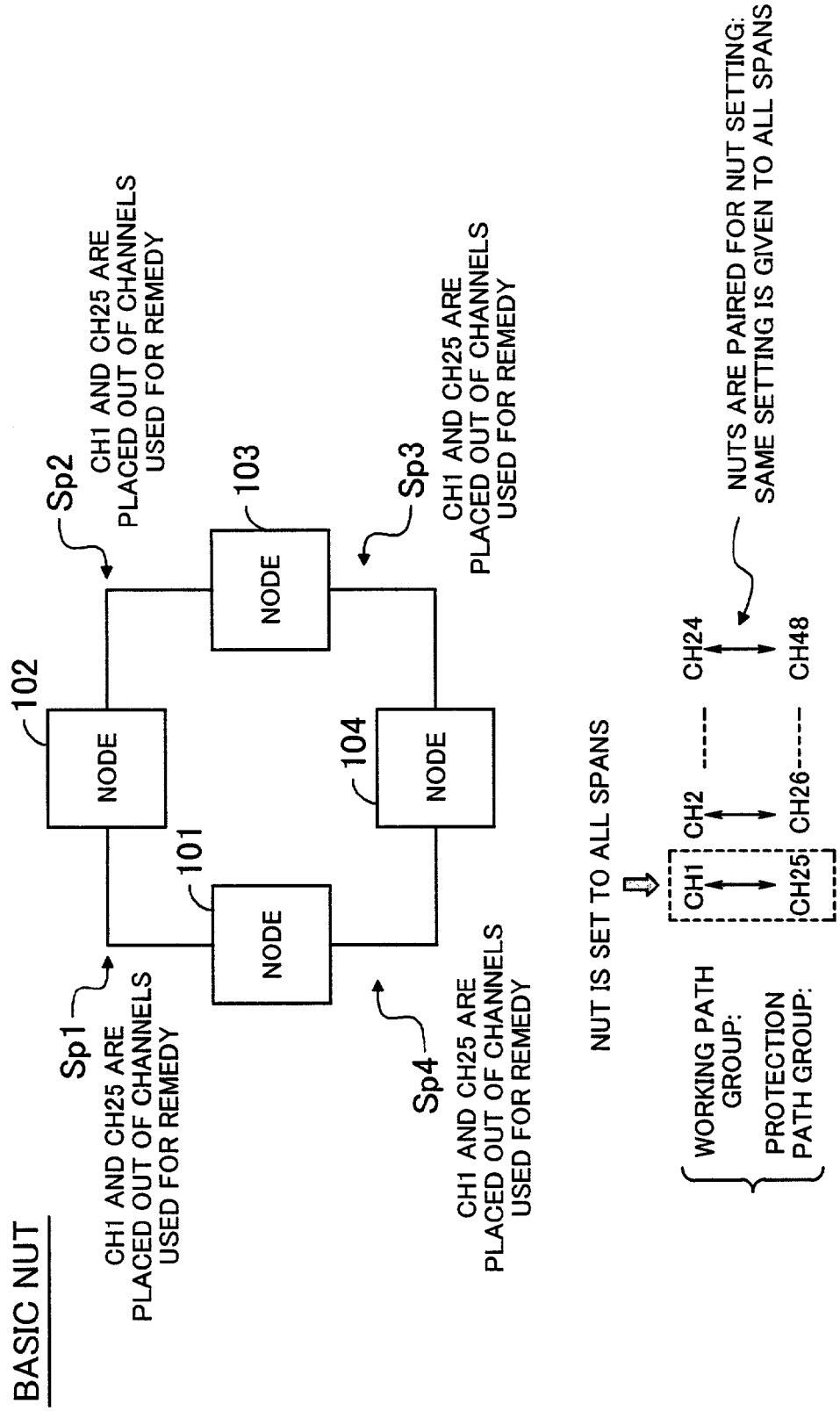
FIG. 21 is a diagram for explaining basic NUT.
Figure 22:
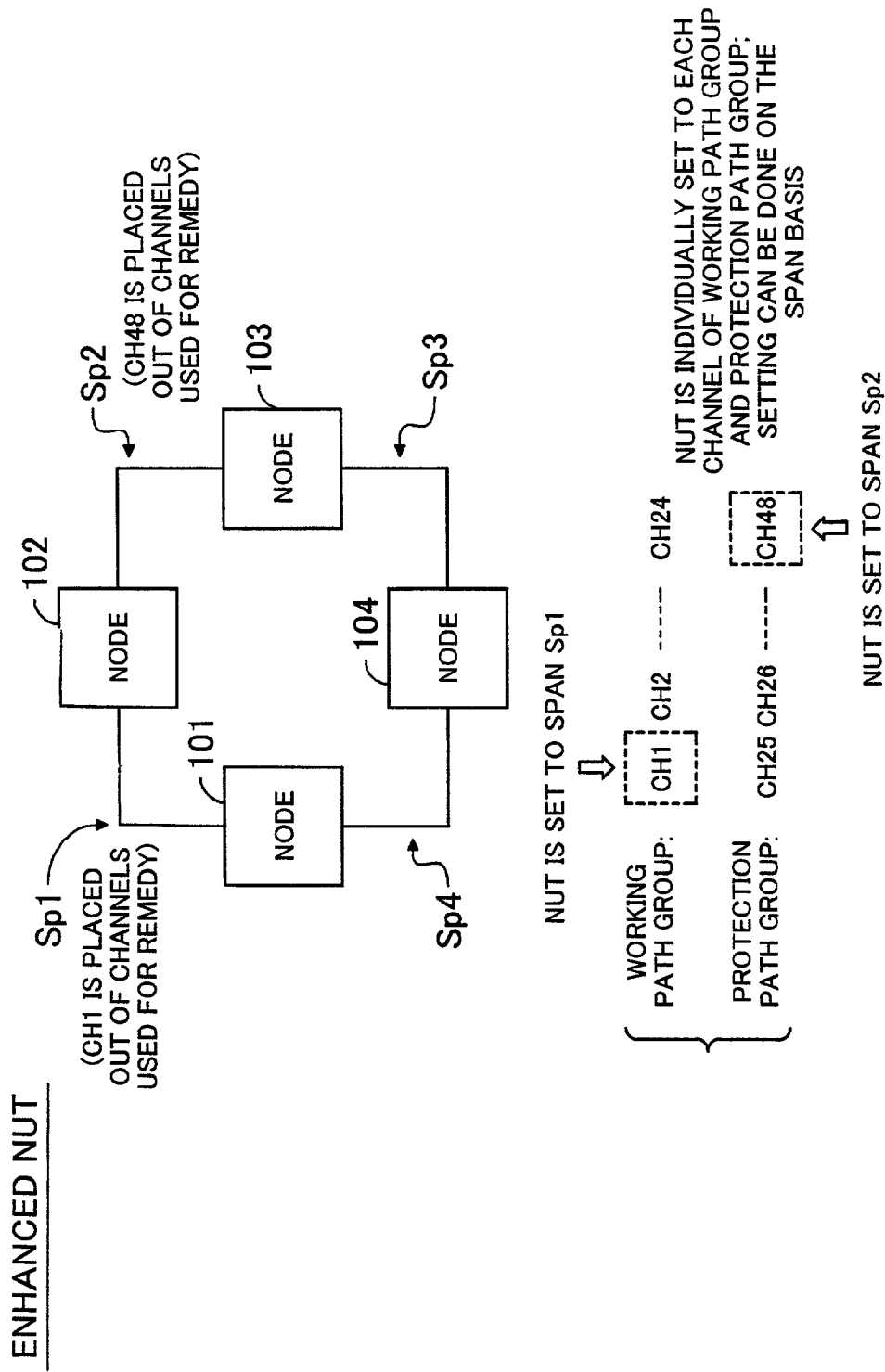
FIG. 22 is a diagram for explaining enhanced NUT.

FIGS. 18 through 20 are diagrams of an operation of the route switch control unit 13 and show an application of the present invention to a path end switch method in which line switching is performed at a path end in the BLSR network (this type of BLSR network is called submarine BLSR).

The BLSR network shown in FIGS. 18 through 20 has nodes N1-N8 connected in the ring formation and routes between the nodes are spans Sp1-Sp8. As shown in FIG. 18, the nodes N1 and N6 communicate with each other via the nodes N7 and N8 using CH1. The nodes N1 and N6 are located at the path ends. A communication takes places via the span Sp2 between the nodes N2 and N3 using CH25 (PCA: Protection Channel Access). CH25 on the span Sp4 between the nodes N4 and N5 has been established as a NUT channel. Under the above situation, a case will now be considered where a line fault occurs in the span Sp8.

As shown in FIG. 19, if NUT has not been set to the BLSR network, the route switch control units 13 of the nodes N1 and N6 located at the fault ends switch the channel from CH1 to CH25 as indicated by the dotted line so as to bypass the fault. That is, CH25 between the nodes N2 and N3 is used to restore the fault of CH1.

In contrast, the case being considered has CH25 to which NUT has been set in the span Sp4 between the nodes N4 and N5. Thus, as shown in FIG. 20, the route switch control units 13 of the nodes N1 and N6 give priority to NUT setting even if a fault occurs in span Sp8, and do not switch the channel from CH1 to CH25. Thus, even if a line fault occurs in the span Sp8, drop to the tributary is enabled between the nodes N2 and N3 and the N4 and N5 using CH25.

As described above, the transmission device 10 of the present invention relays NUT setting information and determines whether its own should set NUT to a channel for establishment of NUT. Further, the transmission device 10 recognizes a section in which a NUT channel has been established and a fault bypass control condition in order to make route switching. Thus, it is possible to automatically configure setting of NUT channel in the BLSR network efficiently and precisely and to thus improve the transmission quality.

As described above, the transmission device of the present invention relays setting information that places a specific channel out of a channel used for restoration, and determines, by referring to the setting information, whether a channel of interest should be placed out of a channel for restoration and establishing the channel. Further, the transmission device recognizes a section in which the channel that is not used for restoration has been established and a fault bypass control condition at the time of occurrence of a fault and performs a route switching control based on a result of recognition.

Thus, it is possible to efficiently realize an automatic construction of NUT channel in the BLSR network precisely and to thus improve the transmission quality.

The foregoing is considered as illustrative only of the principles of the present invention. Further, since numerous modifications and changes will readily occur to those skilled in the art, it is not desired to limit the invention to the extract construction and applications shown and described, and accordingly, all suitable modifications and equipments may be regarded as falling within the scope of the invention in the appended claims and their equivalents.

What is claimed is:

1. A transmission device performing transmission control on a ring network comprising:
   a setting information relay unit relaying setting information that sets a specific channel as a non-preemptible channel restricted from being used for restoration;
   a channel establishment unit determining, by referring to the setting information, whether a channel of interest should be set as said non-preemptible channel and establishing the channel; and
   a route switch control unit recognizing a section in which said non-preemptible channel that is not used for restoration has been established and a fault bypass control condition at the time of occurrence of a fault and performing a route switching control based on a result of recognition, wherein:
   the setting information includes NUT (non-preemptible unprotected traffic) table information that contains a start transmission device ID (identification) and an end transmission device ID) that indicate a section in which said non-preemptible channel should be established, a type of setting for setting said non-preemptible channel, and a relay direction; and
   said channel establishment unit recognizes and establishes said non-preemptible channel via a designated write address in which the NUT table information should be written.

2. The transmission device as claimed in claim 1, wherein said setting information relay unit uses an idle byte out of overhead bytes in order to relay the setting information.

3. The transmission device as claimed in claim 1, wherein:
   said setting information relay unit sends the setting information including an establishment request message, and sends an establishment execution message after receiving a normal response sent back thereto; and
   said channel establishment unit receives the establishment execution message and establishes said non-preemptible channel.

4. The transmission device as claimed in claim 1, wherein said setting information relay unit of a start transmission device is externally provided with the setting information, the setting information externally provided being relayed to an end transmission device, so that said non-preemptible channel can be established.

5. The transmission device as claimed in claim 1, wherein the setting information is relayed to all transmission devices in the ring network from the setting information relay unit in a transmission, so that said non-preemptible channel can be established.

6. The transmission device as claimed in claim 1, wherein, when line switching is performed at ends of a line in which a fault occurs as the fault bypass control condition, the route switch control units in the transmission devices located at the ends of the line in which the fault occurs perform route switching if a fault bypass route does not have any section in which said non-preemptible channel has been established, and do not perform route switching if a fault bypass route has a section in which said non-preemptible channel has been established.

7. The transmission device as claimed in claim 1, wherein, when line switching is performed at ends of a path as the fault bypass control condition, the route switch control units in the transmission devices located at the ends of the path perform route switching if a fault bypass route does not have any section in which said non-preemptible channel has been established, and do not perform route switching if a fault bypass route has a section in which said non-preemptible channel has been established.

8. A transmission system performing transmission control on a network comprising:
   a plurality of transmission devices each comprising a setting information relay unit relaying setting information that sets a specific channel as a non-preemptible channel restricted from being used for restoration;
   a channel establishment unit determining, by referring to the setting information, whether a channel of interest should be set as said non-preemptible channel and establishing the channel;
   a route switch control unit recognizing a section in which said non-preemptible channel that is not used for restoration has been established and a fault bypass control condition at the time of occurrence of a fault and performing a route switching control based on a result of recognition; and
   transmission media connecting the plurality of transmission devices in a ring formation so that a ring network is formed, wherein;
   the setting information includes NUT (non-preemptible unprotected traffic) table information that contains a start transmission device ID (identification) and an end transmission device ID that indicate a section in which said non-preemptible channel should be established, a type of setting for setting said non-preemptible channel, and a relay direction; and
   said channel establishment unit recognizes and establishes said non-preemptible channel via a designated write address in which the NUT table information should be written.

9. A transmission device on a ring network comprising:
   a setting information relay unit relaying NUT (non-preemptible unprotected traffic) setting information for setting a specific channel to a NUT setting that sets the specific channel as a NUT channel restricted from being used for BLSR (Bi-directional Line-Switched Ring) restoration;
   a channel establishment unit determining, by referring to the NUT setting information, whether a channel of interest should be set to The NUT setting so as to establish said NUT channel; and
   a route switch control unit recognizing a section in which said NUT channel has been established and a fault bypass control condition at the time of occurrence of a fault and performing a route switching control based on a result of recognition, wherein;

the NUT setting information includes NUT table information that contains a start transmission device ID (identification) and an end transmission device ID that indicate a section in which the NUT channel should be established, a type of NUT setting including a basic NUT and an enhanced NUT, and a relay direction including an east direction and a west direction; and said channel establishment unit recognizes and establishes the NUT channel via a designated write address in which the NUT table information should be written.

10. The transmission device as claimed in claim 9, wherein said setting information relay unit uses D bytes out of overhead bytes in order to relay the NUT setting information.

11. The transmission device as claimed in claim 9, wherein:

said setting information relay unit sends the NUT setting information including an establishment request message, and sends an establishment execution message after receiving a normal response sent back thereto; and said channel establishment unit receives the establishment execution message and establishes the NUT channel.

12. The transmission device as claimed in claim 9, wherein said setting information relay unit of a start transmission device is externally provided with the NUT setting information, the NUT setting information externally provided being relayed to an end transmission device, so that the NUT channel can be established.

13. The transmission device as claimed in claim 9, wherein the NUT setting information is relayed to all transmission devices in the ring network from the setting information relay unit in an arbitrary transmission, so that the NUT channel can be established.

14. The transmission device as claimed in claim 9, wherein, when line switching for the BLSR restoration takes place at ends of a path as the fault bypass control condition, the route switch control units in the transmission devices located at the ends of the path perform route switching if a fault bypass route does not have any section in which the NUT channel has been established, and do not perform route switching if a fault bypass route has a section in which the NUT channel has been established.

15. A transmission device on a ring network comprising:

a setting information relay unit relaying NUT (non-preemptible unprotected traffic) setting information for setting a specific channel to a NUT setting that sets the specific channel as a NUT channel restricted from being used for BLSR (Bi-directional Line-Switched Ring) restoration;

a channel establishment unit determining, by referring to the NUT setting information, whether a channel of interest should be set to the NUT setting so as to establish said NUT channel; and a route switch control unit recognizing a section in which said NUT channel has been established and a fault bypass control condition at the time of occurrence of a fault and performing a route switching control based on a result of recognition, wherein, when the BLSR employs line switching that is performed at ends of a line in which a fault occurs as the fault bypass control condition, the route switch control units in the transmission devices located at the ends of the line in which the fault occurs perform route switching if a fault bypass route does not have any section in which the NUT channel has been established, and do not perform route switching if a fault bypass route has a section in which the NUT channel has been established.

16. A transmission system performing a transmission control on a network comprising:

a plurality of transmission devices each comprising a setting information relay unit relaying NUT (non-preemptible unprotected traffic) setting information for setting a specific channel to a NUT setting that sets the specific channel as a NUT channel restricted from being used for BLSR (Bi-directional Line-Switched Ring) restoration, a channel establishment unit determining, by referring to the NUT setting information, whether a channel of interest should be set to the NUT setting so as to establish said NUT channel, and a route switch control unit recognizing a section in which said NUT channel has been established and a fault bypass control condition at the time of occurrence of a fault and performing a route switching control based on a result of recognition, wherein;

the NUT setting information includes NUT table information that contains a start transmission device ID (identification) and an end transmission device ID that indicate a section in which the NUT channel should be established, a type of setting for setting the NUT channel, and a relay direction; and said channel establishment unit recognizes and establishes the NUT channel via a designated write address in which the NUT table information should be written.

* * * * *